United States Patent
Ye et al.

(10) Patent No.: US 10,853,977 B2
(45) Date of Patent: Dec. 1, 2020

(54) APPARATUS AND METHOD FOR RECONSTRUCTING IMAGE USING EXTENDED NEURAL NETWORK

(71) Applicant: Korea Advanced Institute Of Science and Technology, Daejeon (KR)

(72) Inventors: JongChul Ye, Daejeon (KR); YoSeob Han, Daejeon (KR); Eunju Cha, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 70 days.

(21) Appl. No.: 16/109,963

(22) Filed: Aug. 23, 2018

(65) Prior Publication Data

US 2019/0066346 A1 Feb. 28, 2019

(30) Foreign Application Priority Data

Aug. 30, 2017 (KR) .................. 10-2017-0110387
Jun. 20, 2018 (KR) .................. 10-2018-0070873

(51) Int. Cl.
*G06K 9/36* (2006.01)
*G06T 11/00* (2006.01)

(52) U.S. Cl.
CPC .......... *G06T 11/008* (2013.01); *G06T 11/006* (2013.01); *G06T 2210/41* (2013.01)

(58) Field of Classification Search
CPC .... G06T 11/008; G06T 11/006; G06T 11/005; G06T 5/002; G06T 2210/41; G06N 3/04; G06N 3/08; G01N 23/10; G01N 23/083
See application file for complete search history.

(56) References Cited

U.S. PATENT DOCUMENTS

| | | | | |
|---|---|---|---|---|
| 10,032,089 B2* | 7/2018 | Jaderberg | ............. | G06K 9/4628 |
| 10,176,424 B2* | 1/2019 | Danihelka | ............. | G06K 9/6257 |
| 10,192,327 B1* | 1/2019 | Toderici | ................ | H04N 19/90 |
| 10,387,743 B2* | 8/2019 | Bronstein | ............. | H04N 5/335 |
| 10,402,700 B2* | 9/2019 | van den Oord | ......... | G06K 9/66 |
| 10,432,953 B2* | 10/2019 | Wierstra | ................. | G06N 3/08 |
| 2016/0370444 A1* | 12/2016 | Peng | ................. | G01R 33/5608 |
| 2017/0193680 A1 | 7/2017 | Zhang | | |
| 2018/0293496 A1* | 10/2018 | Vogels | ................ | G06N 3/0472 |
| 2019/0066346 A1* | 2/2019 | Ye | ......................... | G06T 11/006 |

FOREIGN PATENT DOCUMENTS

KR     10-2013-0074860      7/2013

OTHER PUBLICATIONS

Kang, E. et al., "Wavelet Residual Network for Low-Dose CT via Deep Convolutional Framelets", arXiv:1707.09938v1 (https://arxiv.org/abs/1707.09938v1), Jul. 31, 2017.

* cited by examiner

*Primary Examiner* — Amir Alavi
(74) *Attorney, Agent, or Firm* — Nixon Peabody LLP

(57) ABSTRACT

A method and apparatus for reconstructing an image using an extended neural network is provided. The method includes receiving an input image and reconstructing an output image from the input image using a neural network meeting a predetermined frame constraint. The reconstructing includes transforming the input image into signals corresponding to different frequencies, adjusting coefficients of the transformed signals using a nonlinear function, reconstructing the adjusted coefficients, and inversely transforming all coefficients determined using the reconstructed coefficients into the output image.

19 Claims, 10 Drawing Sheets

APPARATUS AND METHOD FOR RECONSTRUCTING IMAGE USING EXTENDED NEURAL NETWORK

CROSS-REFERENCE TO RELATED APPLICATIONS

A claim for priority under 35 U.S.C. § 119 is made to Korean Patent Application No. 10-2017-0110387 filed on Aug. 30, 2017, and Korean Patent Application No. 10-2018-0070873 filed on Jun. 20, 2018, in the Korean Intellectual Property Office, the entire contents of which are hereby incorporated by reference.

BACKGROUND

Embodiments of the inventive concept described herein relate to a method and apparatus for processing images, and more particularly, relate to a method and apparatus for reconstructing an image using a neural network.

Signal reconstruction in the signal processing field may represent canceling noise components from signals including noise using an algorithm or system or estimating lost information in a low-dimension signal, some information of which is lost, to reconstruct a high-dimension signal from the low-dimension signal. Herein, the signal may include a voice which is a one-dimensional (1D) signal, an image which is a two-dimensional (2D) signal, a video which is a three-dimensional (3D) signal, and the like and may be an N-dimensional signal (where, N is a natural number) having any degree.

Noise may occur in various stages such as a stage of collecting signals or a stage of pre/post-processing signals. Noise following Gaussian and Poisson distributions is typical of local noise. Streaking artifact or ringing artifact is typical of non-local noise. In general, a manner of applying a denoise filter to signals is typical of local denoising. There is a Gaussian smoothing filter, local/non-local averaging filter, or the like for local denoising. In case of images, patch based collaborative filtering or the like is frequently used. Furthermore, there is a manner of cancelling local noise components through a neural network which is supervised and learned for a local image patch through mass data, particularly, a neural network based on a residual block. A manner of applying an iterative reconstruction algorithm, particularly, a model based iterative reconstruction (MBIR) algorithm to signals is typical of non-local noise cancellation. Furthermore, there is a manner of cancelling non-local noise components through a neural network which is supervised and learned for a non-local image patch through mass data, particularly, a neural network based on a convolutional framelet.

SUMMARY

Embodiments of the inventive concept provide a method and apparatus for reconstructing an image using a neural network when there is local noise or non-local noise or when some information of an image is lost.

Embodiments of the inventive concept provide a method and apparatus for reconstructing an image using a neural network based on a convolutional framelet to solve a phenomenon where an image is crushed according to the signal loss of the neural network and a distortion phenomenon which are problems of the previous neural network.

Embodiments of the inventive concept provide a method and apparatus for reconstructing an image to configure a neural network using a local basis and a non-local basis based on a convolutional framelet.

Embodiments of the inventive concept provide a method and apparatus for reconstructing an image to increase reconstruction performance, may reduce an amount of calculation necessary for reconstruction, and may enhance a reconstruction speed by reconstructing an image using a neural network configured based on a convolutional framelet.

Embodiments of the inventive concept provide a method and apparatus for reconstructing an image to simultaneously and efficiently cancel local and non-local noise components of an input signal by using a neural network configured based on a convolutional framelet.

Embodiments of the inventive concept provide a method and apparatus for reconstructing an image to be applicable to universal signal reconstruction by using transform and inverse transform applicable to any order of a signal and a neural network.

According to an aspect of an embodiment, a method for reconstructing an image may include receiving an input image and reconstructing an output image from the input image using a neural network meeting a predetermined frame constraint.

The reconstructing may include transforming the input image into signals corresponding to different frequencies, adjusting coefficients of the transformed signals using a nonlinear function, reconstructing the adjusted coefficients, and inversely transforming all coefficients determined using the reconstructed coefficients into the output image.

The neural network may include a neural network based on a convolutional framelet.

The neural network may include a neural network meeting a low-rank Hankel matrix constraint.

The transforming may include transforming the input image into the signals corresponding to the different frequencies by applying at least one of a wavelet transform, a cosine transform, and a Fourier transform to the input image.

The transforming may include transforming a coefficient component of each of the input image and a feature signal into multiple feature signals without loss of signal to decompose a directional component of each of local noise, included in the coefficient component of each of the input image and the feature signal in a hidden layer in the neural network, and non-local noise based on a non-local basis transform.

The adjusting and the reconstructing may be repeatedly performed according to a form of the neural network.

The reconstructing may include cancelling local noise and non-local noise of the input image using the neural network.

According to another aspect of an embodiment, a method for reconstructing an image may include transforming an input image into signals corresponding to different frequencies, adjusting coefficients of the transformed signals using a nonlinear function, reconstructing the adjusted coefficients using a previously learned neural network, and inversely transforming all coefficients determined using the reconstructed coefficients into an output image.

The transforming may include transforming the input image into multiple feature signals by applying a non-local basis transform to the input image.

The transforming may include transforming the input image into the signals corresponding to the different frequencies by applying at least one of a wavelet transform, a cosine transform, and a Fourier transform to the input image.

The transforming may include transforming a coefficient component of each of the input image and a feature signal into multiple feature signals without loss of signal to decompose a directional component of each of local noise, included in the coefficient component of each of the input image and the feature signal in a hidden layer in the neural network, and non-local noise based on a non-local basis transform.

The adjusting and the reconstructing may be repeatedly performed according to a form of the neural network.

The neural network may include a neural network meeting a predetermined frame constraint.

The neural network may include a neural network based on a convolutional framelet.

The neural network may include a neural network meeting a low-rank Hankel matrix constraint.

The reconstructing may include cancelling local noise and non-local noise of the input image using the neural network.

The adjusting may include adjusting the coefficients of the transformed signals using a local basis transform and the nonlinear function.

The reconstructing may include transforming a low-resolution image into a high-resolution image using a convolutional neural network (CNN) included in the neural network.

According to another aspect of an embodiment, an apparatus for reconstructing an image may include at least one processor. The at least one processor may be configured to receive an input image and reconstruct an output image from the input image using a neural network meeting a predetermined frame constraint.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
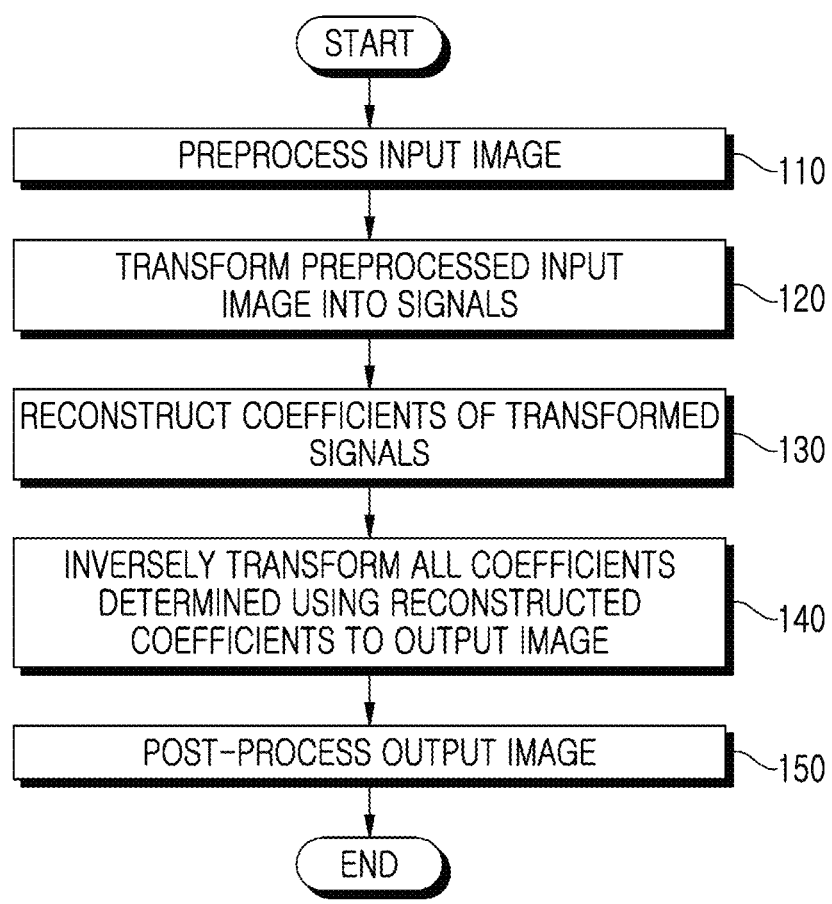
FIG. 1 is a flowchart illustrating a process of processing an input image according to an embodiment.

FIG. 1 is a flowchart illustrating a process of processing an input image according to an embodiment.

Referring to FIG. 1, the flowchart illustrating the process of processing the input image at an image processing device according to an embodiment is shown.

The image processing device according to an embodiment may be a device for processing an input image and may perform, for example, processing of cancelling noise included in the input image or increasing resolution of the input image. Herein, the input image may be an image captured by an image sensor (e.g., an image sensor included in medical imaging equipment or optical imaging equipment, or the like), for example, a medical image in which a patient or a portion of the patient is captured. For example, an input image including noise may include an X-ray image captured with a low dose, an optical image captured during a short exposure time or with low illumination, and a magnetic resonance imaging (MRI) image captured with a low magnetic field. Further, the input image may be an image, a portion of which is lost.

The medical imaging equipment may include MRI, X-ray, X-ray computed tomography (CT), X-ray tomosynthesis ultrasound imaging, or positron emission tomography (PET). The optical imaging equipment may include optical microscopy, fluorescence microscopy, confocal microscopy, optical coherence tomography (OCT), or endoscope imaging equipment.

In operation 110, the image processing device may preprocess an input image. The image processing device according to an embodiment may transform a low-resolution image which is the input image into a high-resolution image using an interpolation technique or an interpolation filter. Further, the image processing device may cancel noise included in the input image using a denoise filter. Furthermore, the image processing device may preprocess the input image using a partial band filter. The preprocessing in the inventive concept is not limited to the method described above, and may be performed by a method which is easy to those skilled in the art.

In operation 120, the image processing device may transform the preprocessed input image into signals corresponding to different domains. The image processing device according to an embodiment may transform the preprocessed input image into signals corresponding to different frequencies. For example, the image processing device may decompose and transform the input image into signals corresponding to different domains using a non-local basis transform. Herein, the signals corresponding to the different domains may refer to multiple feature signals. In this case, the image processing device may transform the input image or a component passing through an upper neural network into the signals corresponding to the different domains by applying the non-local basis transform to the input image or the component passing through the upper neural network. In detail, the image processing device may transform the component passing through the upper neural network into the signals corresponding to the different domains such that multiple frequency components of the component passing through the upper neural network are repeatedly decomposed.

Herein, the non-local basis transform may refer to transforming a coefficient component of a feature signal into multiple feature signals without loss of signal by being applied to the coefficient component of the feature signal in a hidden layer in a neural network.

Alternatively, the non-local basis transform may refer to transforming a coefficient component of a feature signal into multiple feature signals without loss of signal by applying the neural network to a decomposed signal. Specifically, the non-local basis transform may proceed to a process of transforming a coefficient component of each of the input image and a feature signal into multiple feature signals without loss of signal to decompose a directional component of each of local noise, included in the coefficient component of each of the input image and the feature signal in the hidden layer in the neural network, and non-local noise based on the non-local basis transform.

For example, the image processing device may transform the input image into the signals corresponding to the different domains by applying a wavelet transform. Herein, the wavelet transform may be an embodiment of transforming an input image into signals, and a transform technique in which a characteristic of noise included in the input image are clearly evident and capable of performing inverse transform may be applied to the input image without limit. For example, the image processing device may transform the input image into a plurality of signals using a transform technique, for example, a cosine transform (see Equation 1 below), a sine transform, or a Fourier transform (see Equation 2 below). Further, transform of a two-dimensional (2D) signal may be applied other than transform for a one-dimensional (1D) continuous signal described above. When a discrete signal is given, a discrete transform may be applied.

$$\hat{f}(\omega) = \int_{-\infty}^{\infty} f(t) \cos(2\pi\omega t) dt \quad \text{[Equation 1]}$$

$$\hat{f}(\omega) = \int_{-\infty}^{\infty} f(t) e^{-2\pi i \omega t} dt \quad \text{[Equation 2]}$$

In Equations 1 and 2, f(t) may denote a given input image, and f̂(ω) may refer to a coefficient of a transformed signal.

Hereinafter, for convenience of description, a description will be given of a wavelet transform. In detail, the wavelet transform may be represented as Equation 3 below.

$$[W_\Psi f](a, b) = \frac{1}{\sqrt{|a|}} \int_{-\infty}^{\infty} \overline{\Psi\left(\frac{x-b}{a}\right)} f(x) dx \quad \text{[Equation 3]}$$

In Equation 3, f(x) may denote a given input image, $$\Psi\left(\frac{x-b}{a}\right)$$

may refer to a wavelet, and [W_Ψf](a,b) may refer to a wavelet coefficient of a signal.

The wavelet transform according to an embodiment may include a stationary wavelet transform and a wavelet transform using a directional filter bank.

In operation 130, the image processing device may reconstruct coefficients of the transformed signals. The image processing device according to an embodiment may reconstruct the other coefficients using coefficients of multiple frequency signals among the coefficients of the transformed signals and the neural network.

The image processing device according to an embodiment may reconstruct coefficients of multiple feature signals locally or non-locally transformed, using the neural network. Herein, a coefficient of a local transform signal may refer to a coefficient for some domains of multiple feature signals corresponding to different transformed domains. Further, a coefficient of a global transform signal may refer to a coefficient for the entire domain of the multiple feature signals corresponding to the different transformed domain.

The neural network may include a convolutional neural network (CNN). The neural network may include a nonlinear layer for performing any one of various rectified linear unit (ReLU), sigmoid, or Tan h operations. Further, the neural network may include a batch normalization layer which uses a batch normalization operation as an averaging operation.

Furthermore, the neural network may include a channel concatenation layer or a channel sum layer for combining outputs of a plurality of layers in the neural network. Further, the neural network may include the same one or more operation structures (e.g., modules). Herein, normalization may be described interchangeably with standardization. Furthermore, the neural network may include a wavelet transform layer which calculates the transform signal corresponding to the different frequencies of operation 120.

According to an embodiment of the inventive concept, the image processing device may reconstruct an image through the neural network based on a convolution framelet. An operating principle of the neural network, such as a black box, may be analytically arranged through the convolution framelet. In detail, since the convolution framelet may configure the neural network by representing an input signal as a local/non-local basis function, it may interpretively analyze a form of the neural network suitable for various applications.

The neural network may apply a non-local basis transform to an input signal to transform the input signal into a domain suitable for reconstruction and may apply a local basis transform to the input signal to reconstruct a signal in a transform domain. The image processing device may reconstruct the input signal by applying dual basis transform orthogonal to each of a local basis transform and a non-local basis transform through the neural network.

In operation 140, the image processing device may inversely transform all coefficients determined using the reconstructed coefficients into an output image. The inverse transform may be the inverse of the transform performed in operation 120.

In operation 150, the image processing device may post-process the output image. The image processing device according to an embodiment may post-process the output image by applying a denoise filter, an interpolation filter, a regression analysis, a partial band filter, or the like to the inversely transformed output image. The post-processing in the inventive concept is not limited to the method described above, and may be performed by a method which is easy to those skilled in the art.

Operations 110 and 150 described above may be optional operations, and, in some cases, may be performed or omitted.

Figure 2:
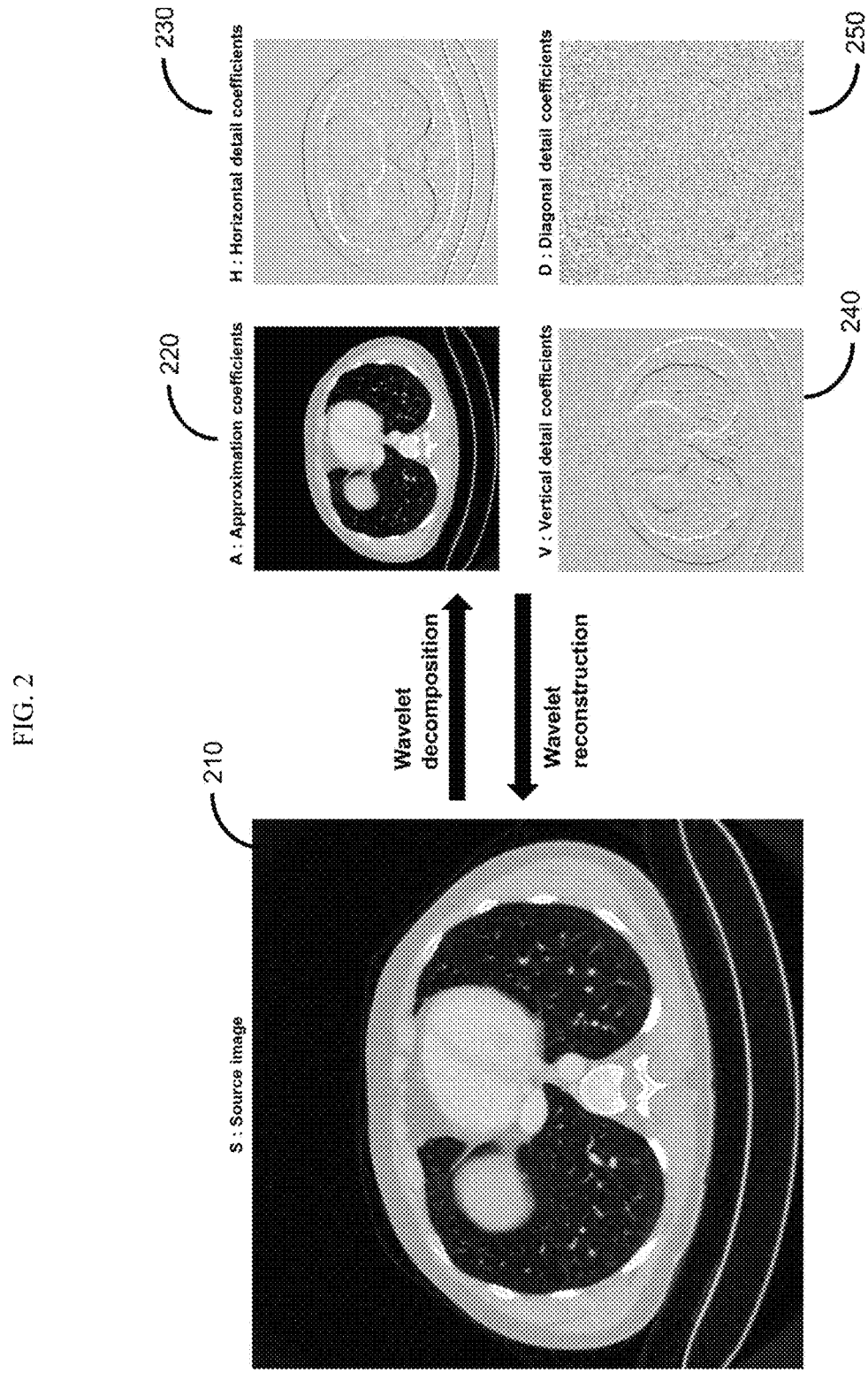
FIG. 2 is a drawing illustrating an example of transforming an input image into signals corresponding to multiple frequencies according to an embodiment.

FIG. 2 is a drawing illustrating an example of transforming an input image into signals corresponding to multiple frequencies according to an embodiment.

Referring to FIG. 2, an example in which an image processing device according to an embodiment transforms an input image 210 into signals corresponding to a plurality of levels (e.g., approximation coefficients 220, horizontal detail coefficients 230, vertical detail coefficients 240, and diagonal detail coefficients 250) is shown. Herein, the transformed signals may refer to multiple feature signals.

Rich information may be obtained in connection with multi-scale and time-frequency local features by a wavelet transform.

The input image 210 may be divided into high-pass and low-pass sub-bands in the wavelet transform shown in FIG. 2. Such a process may be repeated until the low-pass sub-band.

Figure 3:
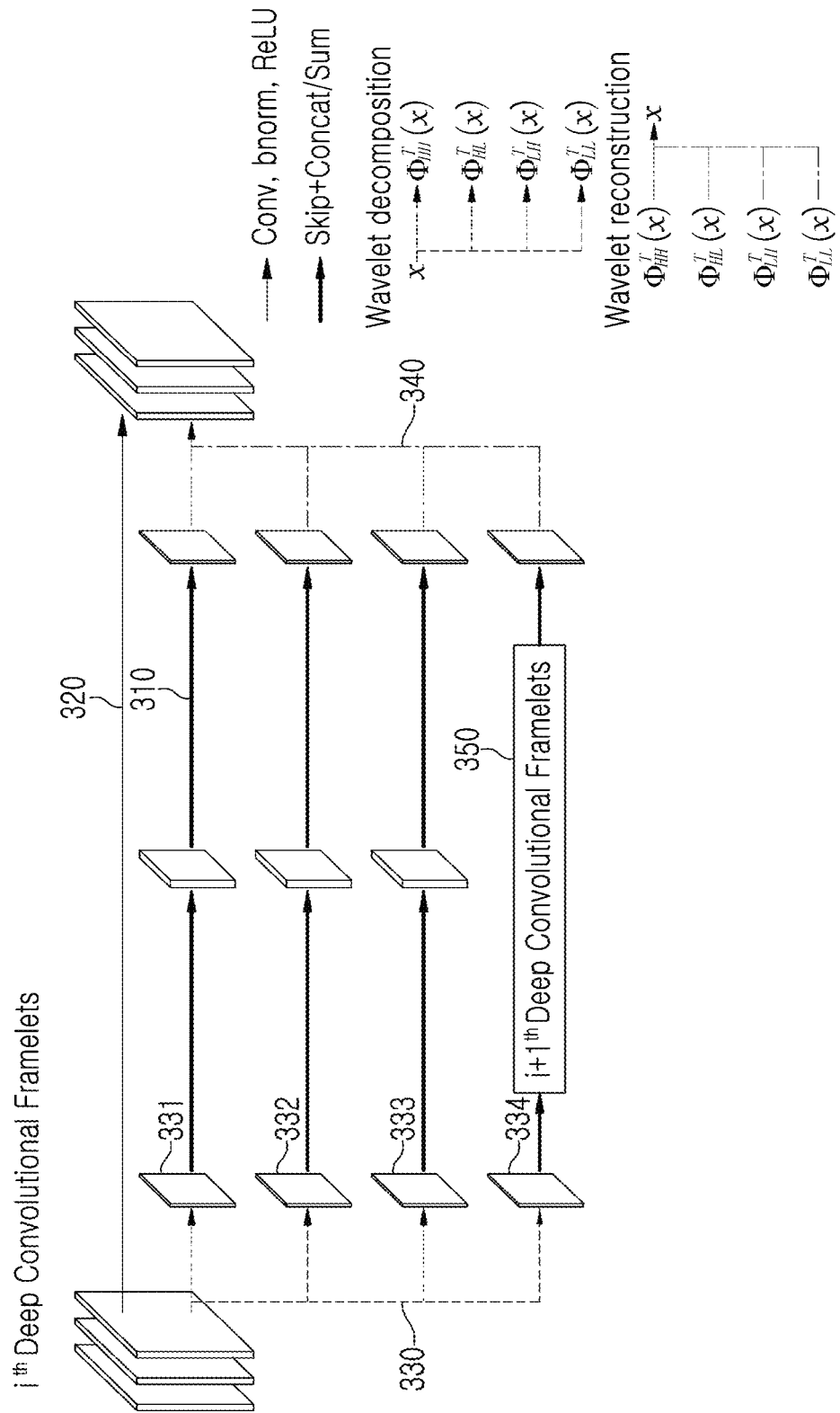
FIG. 3 is a drawing illustrating a neural network according to an embodiment.

FIG. 3 is a drawing illustrating a neural network according to an embodiment.

As shown in FIG. 3, according to an embodiment, a transformed signal may be divided into five paths. A first path (e.g., Conv, bnorm, ReLU 320) may correspond to a signal in which an input transform signal is passed without any processing. A passed signal may be combined with an output signal by a channel concatenation layer or a channel sum layer. The other paths may correspond to signals of high pass components 331 to 333 and a low pass component 334 by a wavelet transform 330. The paths may be decomposed into various components by various transform processes, such as a contourlet transform, other than the four components in such a transform process.

A decomposed transform signal may pass through various neural simulation operations such as a linear transform operation, a nonlinear function operation, and a normalization operation. The normalization operation may represent maintaining average and distribution of various input signals f in a constant form. Adjusted or reconstructed components may be output through wavelet inverse transform 340. An adjusted or reconstructed output component may be combined with the passed component 320. This may be combined by the channel concatenation layer or the channel sum layer. Such a process 350 may be repeated for the low pass component 334.

Figure 4:
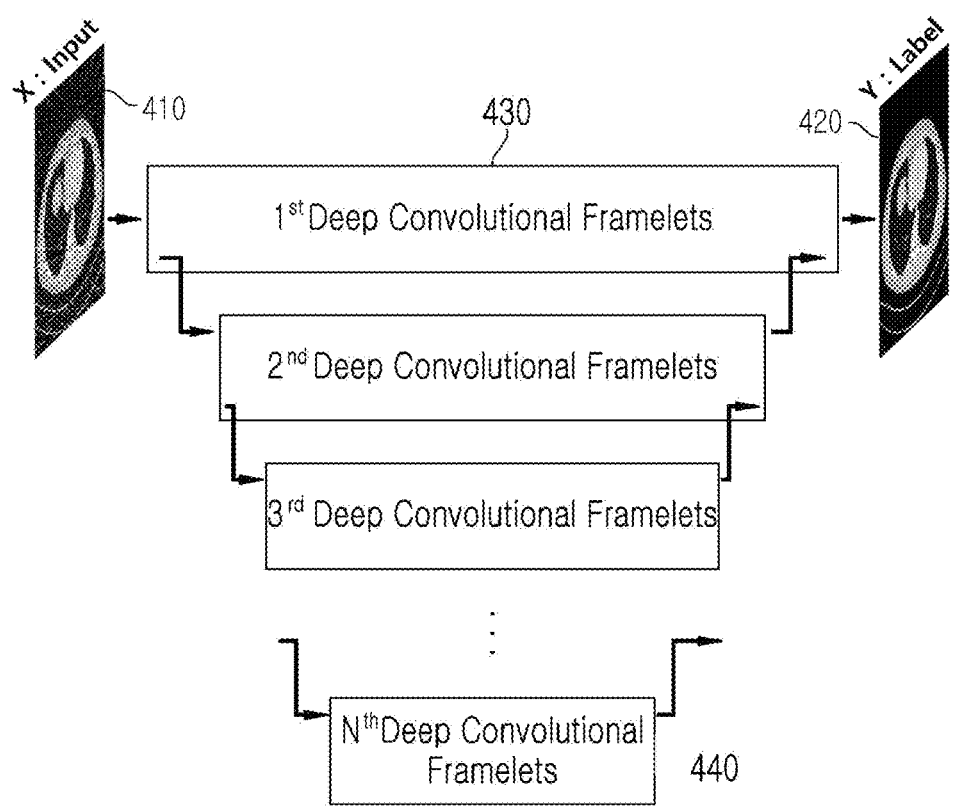
FIG. 4 is a drawing illustrating an example of processing an image using a neural network according to an embodiment.

FIG. 4 is a drawing illustrating an example of processing an image using a neural network according to an embodiment. FIG. 4 illustrates an example in which an image processing device according to an embodiment processes an image using a neural network.

In FIG. 4, a process of removing local Poisson or Gaussian noise and a global linear artifact of a sparse view X-ray CT image is shown. An input image 410 may be a sparse view and may correspond to an input image in operation 110 of FIG. 1. An output image 420 may be a denoised image and may correspond to an output image in operation 140 of FIG. 1. Transform 430 may correspond to the entire process of FIG. 3 and may be repeated for a low pass component. Transform 440 may represent a neural network on which the process of FIG. 3 is repeated N times by recursive repetition.

The operations described above are not limited to denoising, and may be applied to a variety of image reconstruction. For example, when the operations are applied to reconstruction of image resolution, the input image 410 may correspond to a low-resolution image, the output image 420 may correspond to a high-resolution image, and a neural network, for example, a neural network shown in FIG. 3, may be an artificial neural network which is supervised and learned with a low-resolution image and a high-resolution image. Transform 330 and inverse transform 340 are not limited to normal wavelet or contourlet, and may be applied to general signal transform in which there is inverse transform.

Rather than using a denoising approach in an image domain at an existing CNN based denoiser, the image processing device according to an embodiment may use a denoising technique for a wavelet coefficient. It may be seen that such a technique is related to an existing denoising technique which uses wavelet shrinkage. The image processing device according to an embodiment may use inter- and intra-scale correlations using a trainable shrinkage operator which maps a wavelet coefficient having noise to a denoised, clear wavelet coefficient, rather than directly applying a closed form (analytic) shrinkage operator.

Specifically, as shown in FIG. 4, the input image 410 including noise may be decomposed into multiple frequency channels using a wavelet transform in a neural network 430, and high pass components 331 to 333 including noise may be denoised on a patch-by-patch basis using a convolution operator. A low pass component 334 including noise may be decomposed into multiple frequency channels through the wavelet transform in a neural network 440, and the high pass components 331 to 333 including noise may be denoised again through the convolution operator. A denoising component may be transmitted to an upper neural network through inverse wavelet transform. In this case, the used wavelet transform may include a non-redundant wavelet transform and a redundant wavelet transform including a directional wavelet transform. Further, the wavelet transform may include a Haar wavelet transform, a contourlet transform, and the like.

The entire neural network may be configured with multiple neural networks, for example, a neural network shown in FIG. 3 in a multiple manner. Each neural network may be configured with a by-pass connection and 10 convolution layers. Further, the neural network may include a channel concatenation layer for combining several outputs of a previous layer in a channel dimension. This may facilitate quicker end-to-end learning by backpropagating a gradient through another path.

Figure 5:
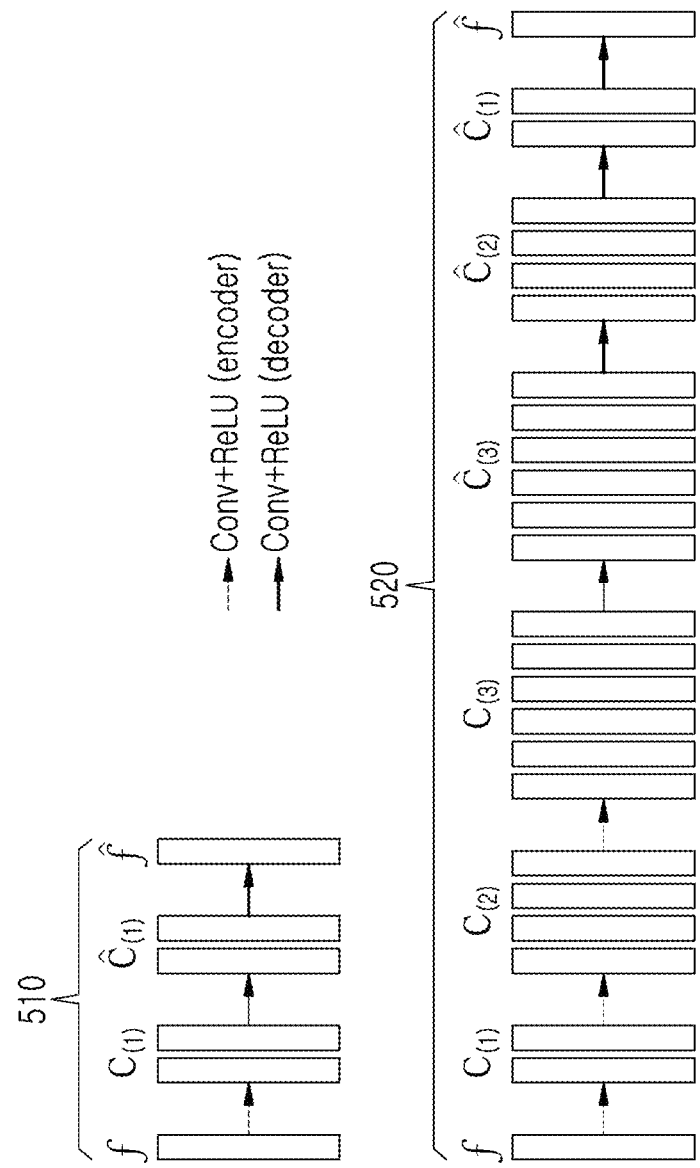
FIG. 5 is a drawing illustrating a simple neural network and an extended neural network based on a convolutional framelet according to an embodiment.

FIG. 5 is a drawing illustrating a simple neural network and an extended neural network based on a convolutional framelet according to an embodiment.

As shown in FIG. 5, a neural network 510 may indicate a neural network based on a convolutional framelet and may refer to a neural network which is configured with one layer composed of a local basis vector and a dual local basis vector.

The convolutional framelet may refer to representing an input signal f using a local basis $\Psi_j$ and a non-local basis $\phi_i$. The convolutional framelet may be represented as Equation 4 below.

$$f = \frac{1}{d}\sum_{i=1}^{n}\sum_{j=1}^{d} <f, \phi_i \otimes \psi_j> \phi_i \otimes \psi_j \quad \text{[Equation 4]}$$

$\phi_i$ may denote a linear transform operation having a non-local basis vector, and $\psi_j$ may refer to a linear transform operation having a local basis vector. In this case, the local basis $\psi_j$ and a local dual basis $\tilde{\psi}_j$ may be orthogonal to each other, and the non-local basis $\phi_i$ and a non-local dual basis $\tilde{\phi}_i$ may be orthogonal to each other. An orthogonal relationship between the bases may be defined as Equation 5 below.

$$\tilde{\Phi}\Phi^T = \sum_{i=1}^{m} \tilde{\phi}_i \phi_i^T = I_{n \times n}, \quad \text{[Equation 5]}$$

$$\Psi\tilde{\Psi}^T = \sum_{j=1}^{q} \psi_j \tilde{\psi}_j^T = I_{d \times d},$$

The input signal f may be represented as Equation 6 by the condition of Equation 5 above.

$$H_d(f) = \tilde{\Phi}\Phi^T H_d(f)\Psi\tilde{\Psi}^T = \tilde{\Phi}C\tilde{\Psi}^T$$

$$C = \Phi^T H_d(f)\Psi = \Phi^T(f \otimes \Psi) \quad \text{[Equation 6]}$$

Herein, $H_d$ may be a Hankel matrix reconstruction operator. This may represent a convolution operation as matrix multiplication. C may refer to a signal transformed by a local basis and a non-local basis, that is, a convolutional framelet coefficient. The signal C transformed by the local basis and the non-local basis may be reconstructed to an original signal through dual basis ($\tilde{\psi}_j, \tilde{\phi}_i$) operations. The process of reconstructing the signal may be represented as Equation 7 below.

$$f = H_d^+(H_d(f)) = \frac{1}{d}\sum_{i=1}^{m}\sum_{j=1}^{q} <f, \phi_i \otimes \psi_j> \tilde{\phi}_i \otimes \tilde{\psi}_j \quad \text{[Equation 7]}$$

As such, a manner of representing the input signal through the local basis and the non-local basis may be called the convolutional framelet. Based on Equations 4 to 7 described above, a transform signal $C_{(1)}$ in a 1-layer neural network shown in FIG. 5 may be represented as $C(1)=\Phi^{(1)T}H_{d(1)}(f)\Psi^{(1)}$, and a reconstructed signal $\hat{f}$ may be represented as $\hat{f}=H_{d(1)}^+(\tilde{\Phi}(\Phi^{(1)T}H_{d(1)}(f)\Psi^{(1)})\tilde{\Psi}^{(1)T})$.

A neural network 520 may refer to an extended neural network based on the convolutional framelet described above, and an encoding part and a decoding part of the neural network 520 may have a symmetric architecture. A transform signal $C_{(2)}$ in a 2-layer neural network may be represented as $C_{(2)}=\Phi^{(2)T}H_{d(2)|p(2)}(\Phi^{(1)T}H_{d(1)}(f)\Psi^{(1)})\Psi^{(2)}$, and a reconstructed signal $\hat{f}$ may be represented as $\hat{f}=H_{d(1)}^+(\tilde{\Phi}^{(1)}(H_{d(2)|p(2)}^+(\tilde{\Phi}^{(2)}(\Phi^{(2)T}H_{d(2)|p(2)}(\Phi^{(1)T}H_{d(1)}(f)\Psi^{(1)})\Psi^{(2)})\tilde{\Psi}^{(2)T}))\tilde{\Psi}^{(1)T})$. A local basis and a non-local basis of each of the transform signal and the reconstructed signal may be repeatedly applied based on a layer by an analysis of an extended neural network based on the convolutional framelet, and a process of optimizing the transform signal and the reconstructed signal may proceed. As such, the process of optimizing the signal based on the analysis of the neural network 520 may be represented by Equation 8 below.

$$C_{(l)}=\Phi^{(l)T}H_{d(l)p(l)}\ldots(\Phi^{(l)T}H_{d(l)}(f)\Psi^{(l)})\ldots\Psi^{(l)}$$

$$\hat{f}=H_{d(l)}^+(\tilde{\Phi}^{(l)}\ldots(H_{d(l)p(l)}^+(\tilde{\Phi}^{(l)}(\Phi^{(l)T}H_{d(1)p(l)}\ldots (\Phi^{(1)T}H_{d(l)}(f)\Psi^{(l)})\ldots\Psi^{(l)})\tilde{\Psi}^{(l)T}))\ldots\tilde{\Psi}^{(l)T}) \quad \text{[Equation 8]}$$

$C_{(l)}$ may denote a signal transformed by L layers, and $\hat{f}$ may denote a signal in which the signal transformed into $C_{(l)}$ is reconstructed.

Figure 6:
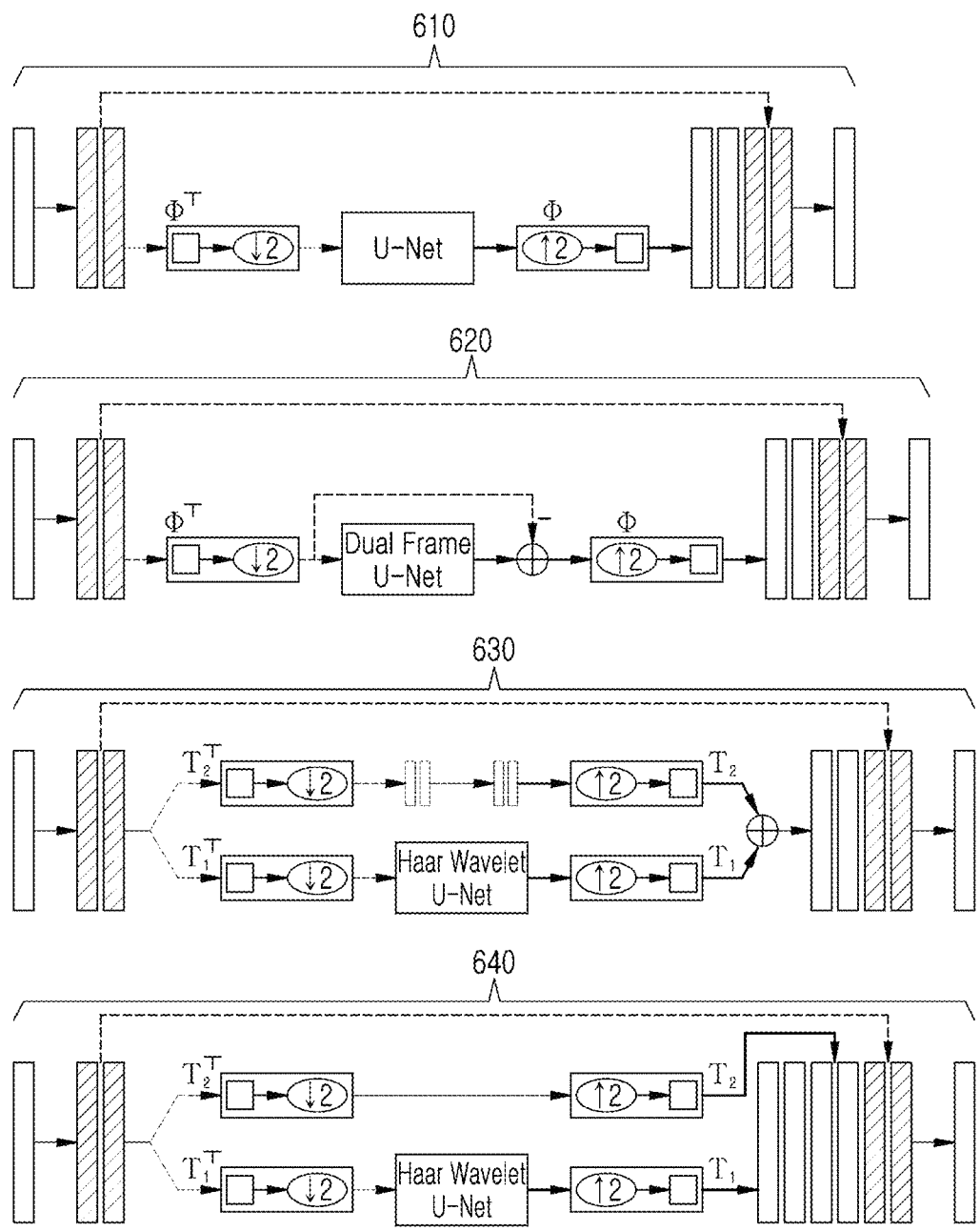
FIG. 6 is a drawing illustrating structures a simplified U-net, a dual frame U-net, and a tight frame U-net.

FIG. 6 is a drawing illustrating a neural network established based on a convolutional framelet according to an embodiment.

A neural network 610 may refer to a neural network of a commonly used U-net structure. The neural network 610 may use an average pooling layer and an average unpooling layer as a non-local basis and may be represented by Equation 9 below.

$$\Phi_{ave} = \frac{1}{\sqrt{2}}\begin{bmatrix} 1 & 0 & \Lambda & 0 \\ 1 & 0 & \Lambda & 0 \\ 0 & 1 & \Lambda & 0 \\ 0 & 1 & \Lambda & 0 \\ M & M & O & M \\ 0 & 0 & \Lambda & 1 \\ 0 & 0 & M & 1 \end{bmatrix} \quad \text{[Equation 9]}$$

Further, the neural network 610 may play a role in transmitting a signal of an input unit to an output unit through a by-pass connection layer represented by a dotted line. Such a basic U-net structure may be represented as frame operator A like Equation 10 below.

$$A := \begin{bmatrix} I \\ \Phi^T \end{bmatrix} \quad \text{[Equation 10]}$$

$$A^T A = I + \Phi\Phi^T$$

Since the frame operator A of the basic U-net structure does not meet Equation 5 above which is a convolution frame constraint, a reconstructed signal like Equation 11 below may be derived.

$$\hat{f} = H_d^+\left(W\begin{bmatrix} E^T \\ \Theta^T \end{bmatrix}\right) \quad \text{[Equation 11]}$$

$$= H_d^+(H_d(f)\Psi E^T) + H_d^+(P_{R(\Phi)}H_d(f)\Psi\Theta^{T1})^9$$

$$= \frac{1}{d}\sum_{i=1}^{q}(f \otimes \psi_i \otimes \xi_i + P_{R(\Phi)}(f \otimes \psi_i) \otimes \theta_i)$$

As represented in Equation 10, since a signal $\hat{f}$ reconstructed through a neural network of a general U-net structure, such as the neural network 610, may fail to be perfectly represented as an original signal f and since a low-frequency component $P_{R(\Phi)}(f\otimes\psi_i)$ is emphasized, a blurred reconstruction signal may be generated.

A neural network 620 may show a dual U-net structure. A signal C transformed by the existing non-local basis may be represented as $C=\Phi^T f$. In this case, the reconstruction signal f may be reconstructed by a dual frame and may be represented by Equation 12 below.

$$\hat{f}=\tilde{\Phi}c=\tilde{\Phi}\Phi^T f=f.$$

$$\tilde{\Phi}=(\Phi\Phi^T)^{-1}\Phi. \quad \text{[Equation 12]}$$

$\tilde{\Phi}$ may denote a dual frame. When the frame operator A of the basic U-net structure represented in Equation 9 above is applied to the frame $\Phi$ represented in Equation 12 above to be represented as the dual frame $\tilde{\Phi}$, it may be represented as Equation 13 below.

$$\tilde{A} = (A^T A)^{-1}A^T = (I + \Phi\Phi^T)^{-1}[I \ \Phi] \quad \text{[Equation 13]}$$

$$= (I - \Phi\Phi^T/2)[I \ \Phi]$$

$$= [I - \Phi\Phi^T/2 \ \Phi/2]$$

$\tilde{A}$ may denote a dual frame of the frame operator A of the basic U-net structure. When a reconstruction signal is represented using the dual frame $\tilde{A}$ defined like Equation 13 above, it may be represented as Equation 14 below.

$$\hat{C} = \tilde{A}Y \quad \text{[Equation 14]}$$

$$= \left(I - \frac{\Phi\Phi^T}{2}\right)C + \frac{1}{2}\Phi S$$

$$= C + \frac{1}{2}\underbrace{\Phi}_{unpooling}\overbrace{(S - \Phi^T C)}^{residual}$$

When a neural network is constructed based on Equation 14 above, the neural network 620 may be derived. It was proven that the dual frame A defined by Equation 14 above indicates performance which is mathematically stabler than the frame A defined by Equation 10 above.

Each of a neural network 630 and a neural network 640 may refer to a neural network indicating a tight U-net structure. Each of a neural network 630 and a neural network 640 may be represented as a neural network which has a tight filter bank or a wavelet as a non-local basis to meet a convolution frame. A non-local basis of a tight U-net may meet a tight frame and may be represented by Equation 15 below.

$$\Phi = [T_1 \wedge T_L] \qquad \text{[Equation 15]}$$

$$\Phi\Phi^T = \sum_{k=1}^{L} T_k T_k^T = cI$$

$T_k$ may denote a tight filter bank or a wavelet basis, and c may denote any positive scaling factor. When the non-local basis defined by Equation 15 above is redefined like the operator A of the basic U-net structure defined by Equation 10 above, it may be represented by Equation 16 below.
[Equation 16]

$$A := [iT_1 \wedge T_L]^T \qquad \text{[Equation 16]}$$

It may be proven that the frame operator A of the tight U-net structure defined above meets Equation 5 above which is a convolution frame constraint. Such a proving process may be represented by Equation 17 below.

$$A^T A = I + \sum_{k=1}^{L} T_k T_k^T = (c+1)I \qquad \text{[Equation 17]}$$

A nonlinear operation may restrict sparsity of a signal with respect to various input signals f, or may restrict positivity of the signal. This may allow a neural network to learn various input signals or a transform value and may allow local and non-local basis vectors of a linear transform operation to find various values. Further, the nonlinear operation may be configured in a form which meets a reconstruction condition.

To enhance a learning effect, a residual learning may be applied to the neural network. Since the residual learning makes a local basis of a linear transform lower-ranked, the unnecessary burden of the neural network may be greatly reduced. Such an internal by-pass connection and an external by-pass connection may enhance performance of canceling local noise and non-local noise by overcoming difficulty of deep network training.

Figure 7:
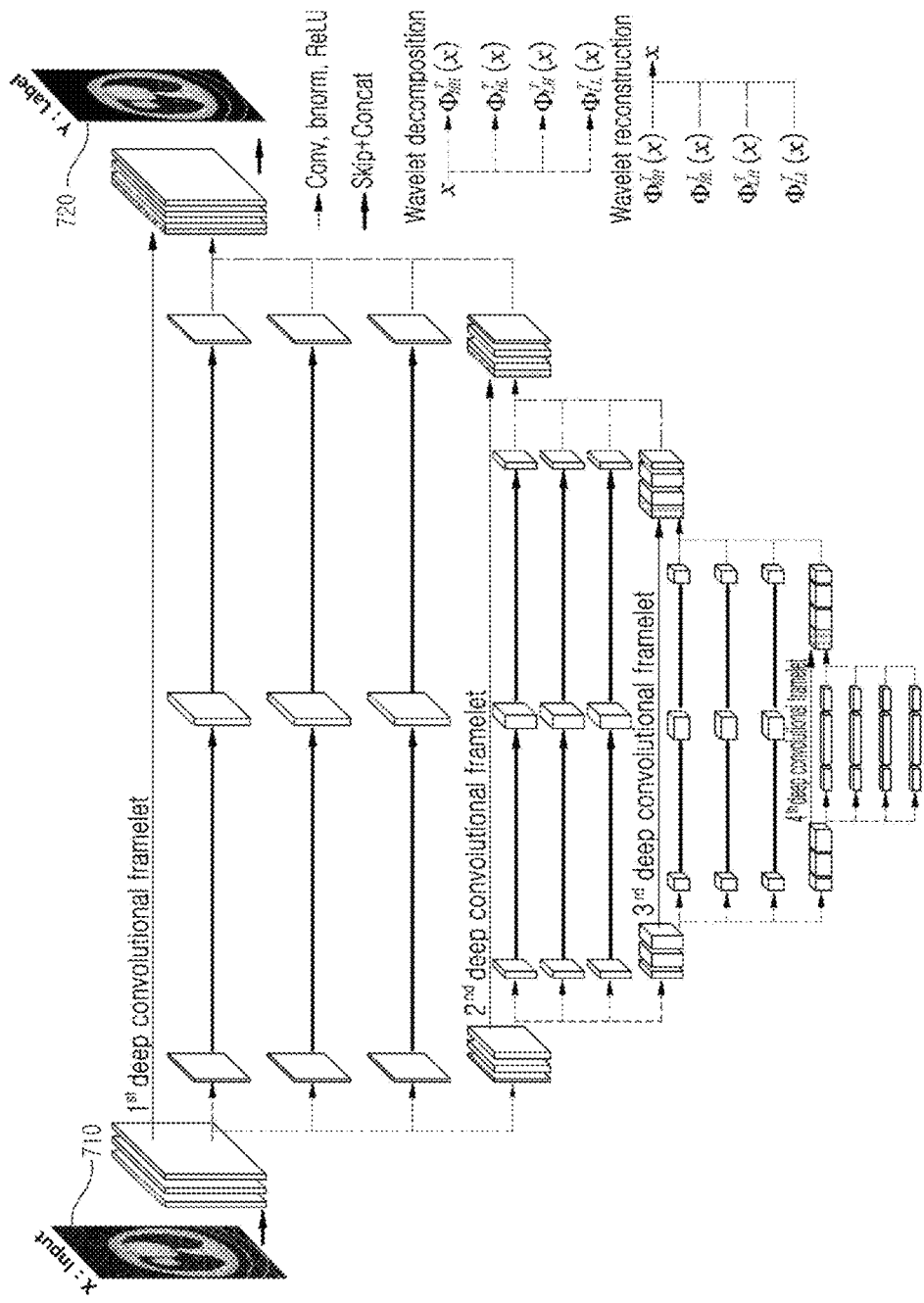
FIG. 7 is a drawing illustrating an example of processing an image using a tight frame U-net according to an embodiment.

FIG. 7 is a drawing illustrating an example of processing an image using a tight frame U-net according to an embodiment. FIG. 7 illustrates an operation structure of a neural network according to an embodiment.

The neural network may include a multi-layer and may include a convolution layer for performing a linear transform operation, a batch normalization layer for performing a normalization operation, a rectified linear unit (ReLU) layer for performing a nonlinear function operation, and a path connection having a chain. Particularly, each stage may include four sequential layers composed of convolution, batch normalization, and ReLU layers having 3×3 kernels.

The final stage may include two sequential layers and the last layer. The last layer may include only convolution having a 1×1 kernel. The number of channels for each convolution layer is shown in FIG. 5, and the channels are doubled after each pooling layer. The operations described above may include parameters. These may be learned through supervised learning. In general, the supervised learning may set a loss function. Parameters of an artificial neural network may be adjusted to minimize a value of the loss function. A minimization problem of the loss function L(•) may be defined as Equation 18 below.

$$\min_{\psi} L(f(\psi, \phi, y), x) \qquad \text{[Equation 18]}$$

In Equation 18 above, y may denote an input signal 710, ψ may denote a local basis, and φ may refer to a non-local basis. x may denote a reference signal, and f(ψ,φ,y) may refer to an output signal 720 of the neural network.

A loss function L(•,•) may use $l_p$-norm and may be defined as Equation 19 below.

$$L(f(\psi,\phi,y),x) = \|f(\psi,\phi,y)-x\|_p^p \qquad \text{[Equation 19]}$$

In case of $\|x\|_p$ (p>0), vector x, a size of which is n, may be defined as Equation 20 below.

$$\|x\|_p = (|x_1|^p + |x_2|^p + |x_3|^p \wedge |x_n|^p)^{\frac{1}{p}} \qquad \text{[Equation 20]}$$

To prevent overfitting of the reference signal x, the supervised learning may perform a minimization problem by adding a regularization term to the local basis ψ of the neural network like Equation 21 below.

$$\min_{\psi} L(f(\psi, \phi, y), x) + \Phi(\psi) \qquad \text{[Equation 21]}$$

Herein, function (Φ(•)) may use $l_p$-norm. For example, a problem of minimizing a loss function which uses $l_p$-norm and a regularization term may be represented as Equation 22 below.

$$\min_{\psi} \|f(\psi, \phi, y) - x\|_2^2 + \|\psi\|_2^2 \qquad \text{[Equation 22]}$$

A minimization problem for supervised learning of the local basis ψ of the neural network may be usually performed through back propagation. In such a manner, each parameter may be repeatedly corrected through gradient descent based on a first-order derivative and may be represented as Equation 23 below.

$$\psi_l^{t+1} = \psi_l^t - \tau\left(\frac{\partial L}{\partial \psi_l}(\psi_1^t) + \frac{\partial \phi}{\partial \psi_l}(\psi_1^t)\right) \qquad \text{[Equation 23]}$$

$\psi_1$ may denote any variable of an operation performed in an $l^{th}$ layer fl, and t may refer to the number of times a variable is corrected. Herein, a slope $$\frac{\partial L}{\partial \psi_l}(\psi_1^l)$$

is unusually calculated based on a differential chain rule and may be defined as Equation 24 below.

$$\frac{\partial L}{\partial \psi_l} = \frac{\partial L}{\partial f_L} \frac{\partial f_L}{\partial f_{L-1}} \Lambda \frac{\partial f_{l+1}}{\partial f_l} \frac{\partial f_l}{\partial \psi_l} \qquad \text{[Equation 24]}$$

A linear transform operation in the neural network may include any order of a convolution operation. A neural network, linear transform of which is represented as convolution, may be referred to as a convolutional neural network (CNN).

A nonlinear function operation may include ReLU, CReLU (see Equations 25 and 26 below), sigmoid (see Equation 27 below), and tan h (see Equation 28 below).

$$f(x) = \max(x, 0) \qquad \text{[Equation 25]}$$

$$f(x) = \max([x, -x], 0) \qquad \text{[Equation 26]}$$

$$f(x) = \frac{1}{1 + e^{-x}} \qquad \text{[Equation 27]}$$

$$f(x) = \frac{e^x - e^{-x}}{e^x + e^{-x}} \qquad \text{[Equation 28]}$$

In Equations 25 to 28, f may be equivalently applied to a separate value of an input signal.

A normalization operation may include a batch normalization method. Batch normalization may be represented as Equation 29 below.

$$\hat{x}_i = \frac{x_i - \mu}{\sqrt{\sigma^2 + \varepsilon}} \qquad \text{[Equation 29]}$$

In Equation 29 above, each of $\mu$ and $\sigma$ may denote a parameter value learned through supervised learning, and $\varepsilon$ may refer to any constant value.

The neural network according to an embodiment may be learned by minimizing a loss function defined by Equation 30 below.

$$L(w, x, y) = \Sigma_j \|F(w; x)_j - y_j\|_2^2 + \lambda \Sigma_k \|\omega_k\|_2^2 \qquad \text{[Equation 30]}$$

Herein, w may denote a set of all network parameters including coefficients of convolution filters and parameters in batch normalization layers, and x and y may refer to a sparse view and a general dose CT image, respectively. F(w, x) may denote a denoised reconstruction image. A normalization parameter (or a decay rate) may be used.

The minimization of a loss function may be performed based on error back propagation. An initial learning rate may be set in the error back propagation, and a learning rate may be continuously reduced. Convolution kernel weights of the neural network may be initialized using any Gauss distribution. The loss function may be minimized using a mini-batch gradient descent algorithm. Further, a CT image learned for an increase in data may be randomly shifted, flipped, or rotated.

As described above, the neural network according to an embodiment of the inventive concept may reconstruct a high-resolution image from an input image by being configured to meet a low-rank Hankel matrix constraint or meet a frame constraint (or a frame condition). The inventive concept may reconstruct (or process) an image using a convolutional framelet, for example, a neural network based on a deep convolutional framelet.

A description will be given of the frame, the Hankel matrix, and the deep convolutional framelet.

When a function set $\{\phi_k\}$ $k \in \Gamma$ meets an inequality of Equation 31 below in Hilbert space H, it may be called a frame.

$$\alpha \|f\|^2 \leq \sum_{k \in \Gamma} |<f, \phi_k>|^2 \leq \beta \|f\|^2, \forall f \in H \qquad \text{[Equation 31]}$$

Herein, $\alpha$, $\beta > 0$ may denote a frame range. When $\alpha = \beta$, a frame may be tight.

A frame may be associated with a frame operator $\Phi$ composed of $\phi_k$: $\Phi = [\Lambda \ \phi_{k-1} \ \phi_k \ \Lambda]$, and Equation 31 above may be equivalently represented as Equation 32 below.

$$\alpha \|f\|^2 \leq \|\Phi^T f\|^2 \leq \beta \|f\|^2, \forall f \in H \qquad \text{[Equation 32]}$$

The Frame Range May be Represented as Equation 33 below.

$$\alpha = \sigma_{min}(\Phi \Phi^T), \beta = \sigma_{max}(\Phi \Phi^T) \qquad \text{[Equation 33]}$$

Herein, $\sigma_{min}$ (A) and $\sigma_{max}$ (A) may denote minimum and maximum singular values of A, respectively.

When a lower limit $\alpha$ of the frame range is not "0", since $\hat{f} = \tilde{\Phi} c = \tilde{\Phi} \Phi^T f = f$, the reconstruction of an original signal may be performed from a frame coefficient $c = \Phi^T f$ using a dual frame $\tilde{\Phi}$ which meets a frame condition indicated by Equation 34 below.

$$\tilde{\Phi} \Phi^T = I \qquad \text{[Equation 34]}$$

An explicit form of the dual frame may be given by a pseudo-inverse like Equation 35 below.

$$\tilde{\Phi} = (\Phi \Phi^T)^{-1} \Phi \qquad \text{[Equation 35]}$$

When a frame coefficient is corrupt by noise $\omega$, that is, when $c = \Phi^T f + \omega$, a reconstructed signal using the dual frame may be given by $\hat{f} = \tilde{\Phi} c = \tilde{\Phi}(\Phi^T f + \omega) = f + \tilde{\Phi} \omega$. Thus, a noise amplification coefficient may be calculated like Equation 36 below.

$$\frac{\|\tilde{\Phi}\omega\|^2}{\|\omega\|^2} = \frac{\sigma_{max}(\Phi\Phi^T)}{\sigma_{min}(\Phi\Phi^T)} = \frac{\beta}{\alpha} = \kappa(\Phi\Phi^T) \qquad \text{[Equation 36]}$$

Herein, $\kappa(\bullet)$ may denote a condition number.

A tight frame may have a minimum noise amplification factor ($\beta/\alpha = 1$) and may be equivalent to a condition such as Equation 37 below.

$$\Phi^T \Phi = cI, c > 0 \qquad \text{[Equation 37]}$$

Since the Hankel matrix is a key component of a deep convolutional framelet theory (K. Zhang, W. Zuo, Y. Chen, D. Meng, and L. Zhang, "Beyond a Gaussian denoiser: Residual learning of deep CNN for image denoising," arXiv preprint arXiv:1608.03981, 2016.), the inventive concept is briefly described with respect to the Hankel matrix.

To avoid special treatment of a boundary condition, the inventive concept may be mainly derived using a circular convolution. For simplification, the inventive concept may consider 1D signal processing, but the extension to 2D signal processing may be simple.

When $f=[f[1], \Lambda, f[n]]^T \in R^n$ is an input signal vector, a wrap-around Hankel matrix $H_d(f)$ may be defined as Equation 38 below.

$$H_d(f) = \begin{bmatrix} f[1] & f[2] & \Lambda & f[d] \\ f[2] & f[3] & \Lambda & f[d+1] \\ M & M & O & M \\ f[n] & f[1] & \Lambda & f[d-1] \end{bmatrix} \quad \text{[Equation 38]}$$

Herein, d may denote a matrix pencil parameter.

When a multi-channel signal is given like Equation 39 below, an extended Hankel matrix may be configured by stacking a Hankel matrix. The extended Hankel matrix may be represented as Equation 40 below.

$$F:=[f_1 \Lambda f_p] \in R^{n \times p} \quad \text{[Equation 39]}$$

$$H_{d|p}(F):=[H_d(f_1)H_d(f_2)\Lambda H_d(f_p)] \quad \text{[Equation 40]}$$

Herein, the Hankel matrix may be closely related to a convolution operation of the CNN. Particularly, a single-input single-output (SISO) convolution in the CNN may be represented as Equation 41 below with respect to a given convolution filter $\bar{\psi}=[\psi[d],\Lambda,\psi[1]]^T \in R^d$ using the Hankel matrix.

$$y=f \otimes \bar{\psi}=H_d(f)\psi \in R^n \quad \text{[Equation 41]}$$

Similarly, a single-input multi-output (SIMO) convolution using a CNN filter kernel $\Psi=[\psi_1,\Lambda,\psi_q] \in R^{d \times q}$ may be represented as Equation 42 below.

$$Y=f \otimes \overline{\Psi}=H_d(f)\Psi \in R^{n \times q} \quad \text{[Equation 42]}$$

Herein, q may denote the number of output channels.

A multi-input multi-output (MIMO) of the CNN may be represented as Equation 43 below.

$$Y = F \otimes \Psi = H_{d|p}(F) \begin{bmatrix} \Psi_1 \\ M \\ \Psi_p \end{bmatrix} \quad \text{[Equation 43]}$$

Herein, p and q may denote the number of input channels and the number of output channels, respectively.

A $j^{th}$ input channel filter may be represented as Equation 44 below.

$$\Psi_j=[\psi_1^j \Lambda \psi_q^j] \in R^{d \times q} \quad \text{[Equation 44]}$$

The extension to a multi-channel 2D convolution operation for an image domain CNN is straightforward, since similar matrix vector operations may also be used. In other words, in the extension to the multi-channel 2D convolution operation for the image domain CNN, there may be only a change in the definition of the Hankel matrix or the extended Hankel matrix, which is defined as a block Hankel matrix.

One of the most intriguing features of the Hankel matrix is that it often has a low-rank structure and its low-rankness is related to the sparsity in the Fourier domain. These properties may be very useful in being proved in applications for many inverse problems and low-level computer vision problems.

A brief description will be given of the theory of the deep convolutional framelet. The inventive concept may consider the following regression problem such as Equation 45 below using an existing Hankel matrix method.

$$\min_{f \in R^n} \|f^* - f\|^2 \quad \text{[Equation 45]}$$

subject to $RANKH_d(f) \leq r < d$

Herein, $f^* \in R^d$ may denote a ground-truth signal.

A traditional method for solving the problem of Equation 45 above may use singular value shrinkage or matrix factorization, but may solve this problem using learning-based signal representation in the deep convolutional framelet.

Specifically, a Hankel structured matrix $H_d(f)$ may have singular value decomposition $H_d(f)=U\Sigma V^T$ with respect to an executable value f for Equation 45 above. In the Equation above, $U=[u_1 \Lambda u_r] \in R^{n \times r}$ and $V=[v_1 \Lambda v_r] \in R^{d \times r}$ may denote left and right singular vector basis matrices, respectively. $\Sigma=(\sigma_{ij}) \in R^{r \times r}$ may be a diagonal matrix having a singular value. The inventive concept may consider a matrix pair $\Phi$, $\tilde{\Phi} \in R^{n \times n}$ meeting a frame condition indicated by Equation 46 below.

$$\tilde{\Phi}\Phi^T=I \quad \text{[Equation 46]}$$

Such bases may denote non-local bases, since they interact with each other by being multiplied by all n-components of $f \in R^n$ and the left of $H_d(f) \in R^{n \times d}$. The inventive concept may require another matrix pair $\Psi$, $\tilde{\Psi} \in R^{d \times r}$ which meets a low-dimensional sub-space limitation indicated by Equation 47 below.

$$\Psi \tilde{\Psi}^T=R_R(V) \quad \text{[Equation 47]}$$

Since they interact with only a d-neighborhood of a signal $f \in R^n$, they may denote local bases. Using Equations 46 and 47, a Hankel matrix reconstruction operator, such as Equation 48 below, for an input signal f may be obtained.

$$H_d(f)=\tilde{\Phi}\Phi^T H_d(f)\Psi \tilde{\Psi}^T \quad \text{[Equation 48]}$$

Herein, $H_d$ may denote a Hankel matrix reconstruction operator.

When $\Phi^T H_d(f)\Psi$ is factorized form Equation 49 above, the decomposition off which uses a single layer encoder-decoder architecture may occur like Equation 49 below $$f=(\tilde{\Phi}C) \otimes V(\tilde{\Psi}), C=\Phi^T(f \otimes \overline{\Psi}) \quad \text{[Equation 49]}$$

Herein, encoder and decoder convolution filters may be given like Equation 50 below.

$$\Psi := [\bar{\psi}_1 \Lambda \bar{\psi}_q] \in R^{d \times q}, v(\tilde{\Psi}) := \frac{1}{d} \begin{bmatrix} \tilde{\psi}_1 \\ M \\ \tilde{\psi}_q \end{bmatrix} \in R^{dq} \quad \text{[Equation 50]}$$

Equation 49 above may be a general form of signals which are associated with a rank-r Hankel structured matrix. The inventive concept may be interested in specifying bases for optimum performance. In a deep convolutional framelet, $\Phi$ and $\tilde{\Phi}$ may correspond to user-defined generalized pooling and unpooling for meeting the frame condition of Equation 46 above. On the other hand, the filters $\Psi$, $\tilde{\Psi}$ may be required to be estimated from data. To restrict a search space of the filters, the inventive concept may consider $H_0$ composed of signals which have a positive framelet coefficient. $H_0$ composed of the signals which have the positive framelet coefficient may be represented as Equation 51 below.

$$H_0 = \{f \in R^n \mid f = (\tilde{\Phi}C) \otimes v(\tilde{\Psi})$$
$$C = \Psi^T(f \otimes \overline{\Psi}) \geq 0\}$$
[Equation 51]

The main goal of neural network training may be to learn $(\Psi, \tilde{\Psi})$ from training data $\{(f_{(i)}, f_{(i)}^*)\}_{i=1}^N$ assuming that $\{f_{(i)}^*\}$ is associated with rank-r Hankel matrices. Specifically, a regression problem of the inventive concept under the rank-r Hankel matrix constraint of Equation 45 above for the training data may be given like Equation 52 below.

$$\min_{\{f_{(i)}\} \in H_0} \sum_{i=1}^N \|f_{(i)}^* - f_{(i)}\|^2$$
[Equation 52]

Equation 52 above may be represented as Equation 53 below.

$$\min_{(\Psi, \tilde{\Psi})} \sum_{i=1}^N \|f_{(i)}^* - Q(f_{(i)}; \Psi, \tilde{\Psi})\|^2$$
[Equation 53]

Herein, Q may be represented as Equation 54 below.

$$Q(f_{(i)}; \Psi, \tilde{\Psi}) = (\tilde{\Phi}C[f_{(i)}]) \otimes v(\tilde{\Psi})$$
[Equation 54]

Herein, C may be represented as Equation 55 below.

$$C[f_{(i)}] = \rho(\Phi^T(f_{(i)} \otimes \overline{\Psi}))$$
[Equation 55]

Herein, $\rho(\cdot)$ may refer to an ReLU which assigns positivity to a framelet coefficient.

After the network is fully trained, inference for a given noisy input f is simply done by $Q(f; \Psi, \tilde{\Psi})$. This method may be the same as finding a denoised value having a rank-r Hankel structured matrix.

Figure 8:
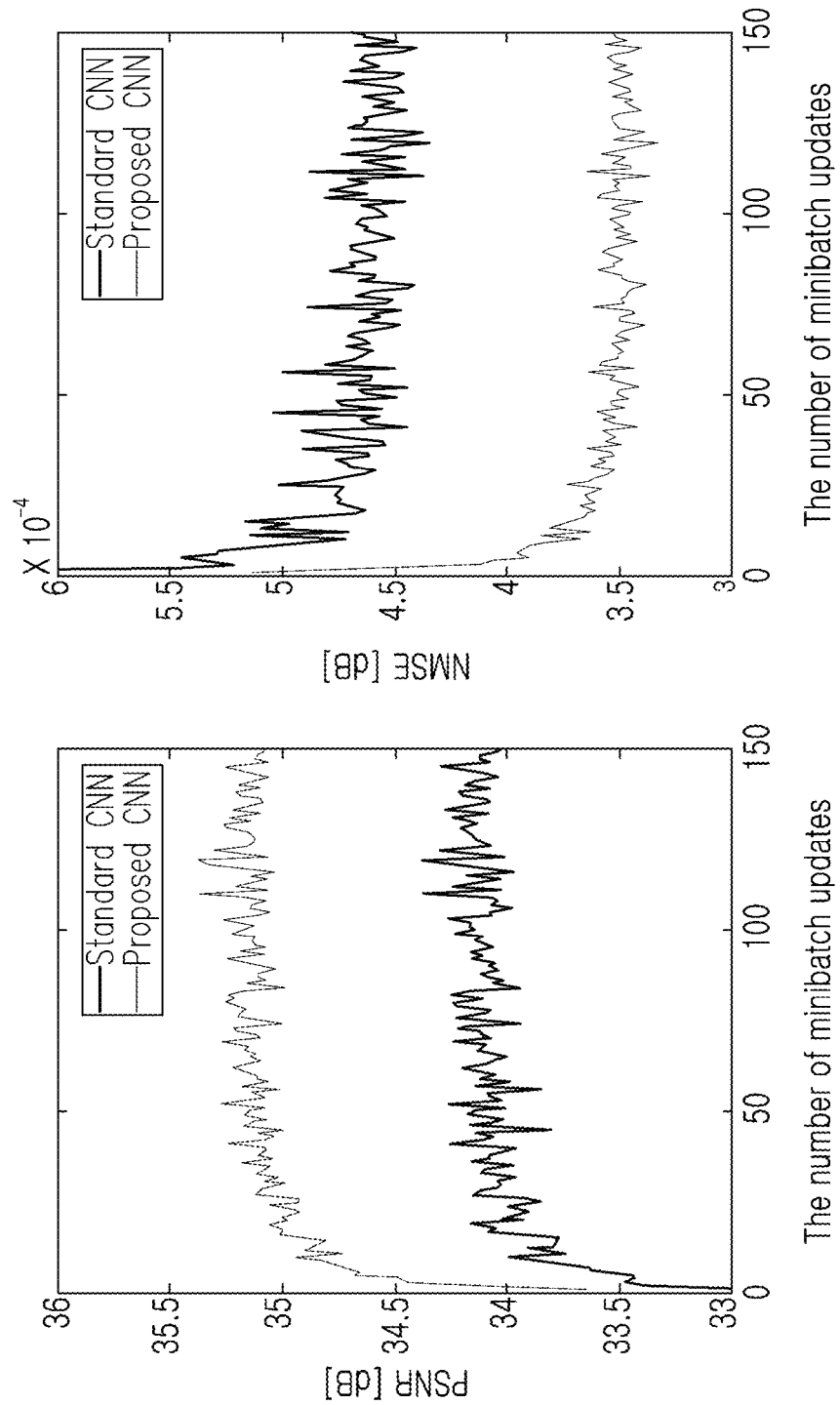
FIG. 8 is a drawing illustrating efficiency of supervised learning for a neural network according to an embodiment.

FIG. 8 is a drawing illustrating efficiency of supervised learning for a neural network according to an embodiment.

Referring to FIG. 8, a graph indicating supervised learning efficiency of an artificial neural network applied in multiple frequency domains is shown. The graph may indicate a learning result of the artificial neural network used for denoising of a sparse X-ray CT image. A technique of performing denoising using the artificial neural network in the multiple frequency domains shows a more excellent result in a peak signal to noise ratio (PSNR) and normalized mean squared errors (NMSE) than that to which the artificial neural network is applied in a single frequency domain.

Figure 9:
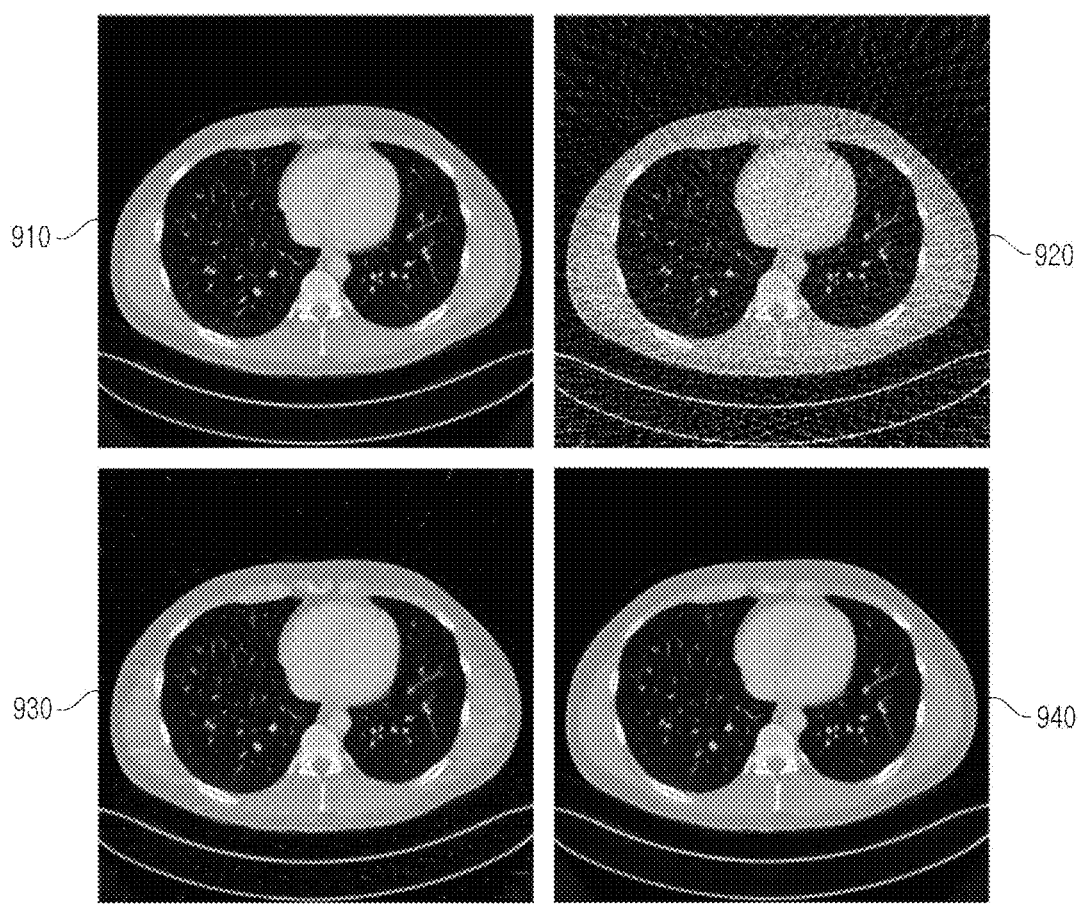
FIG. 9 is a drawing illustrating an example of each of a normal image, an input image including noise, and a denoised output image according to an embodiment.

FIG. 9 is a drawing illustrating an example of each of a normal image, an input image including noise, and a denoised output image according to an embodiment.

Referring to FIG. 9, a processing result of the above-mentioned image processing method is shown in a sparse view CT image including noise. In FIG. 9, the entire view X-ray CT image 910, a sparse view X-ray CT image 920, a result image 930 in which a low-dose image is reconstructed in a manner which uses a neural network in a single frequency domain, and a result image 940 in which a low-dose image is reconstructed in a manner which uses a neural network in multiple frequency domains are shown. It may be identified that the result image 940 which is denoised through the image processing method according to an embodiment is more excellent than the result image 930 of the manner which uses the neural network in the single frequency domain.

Figure 10:
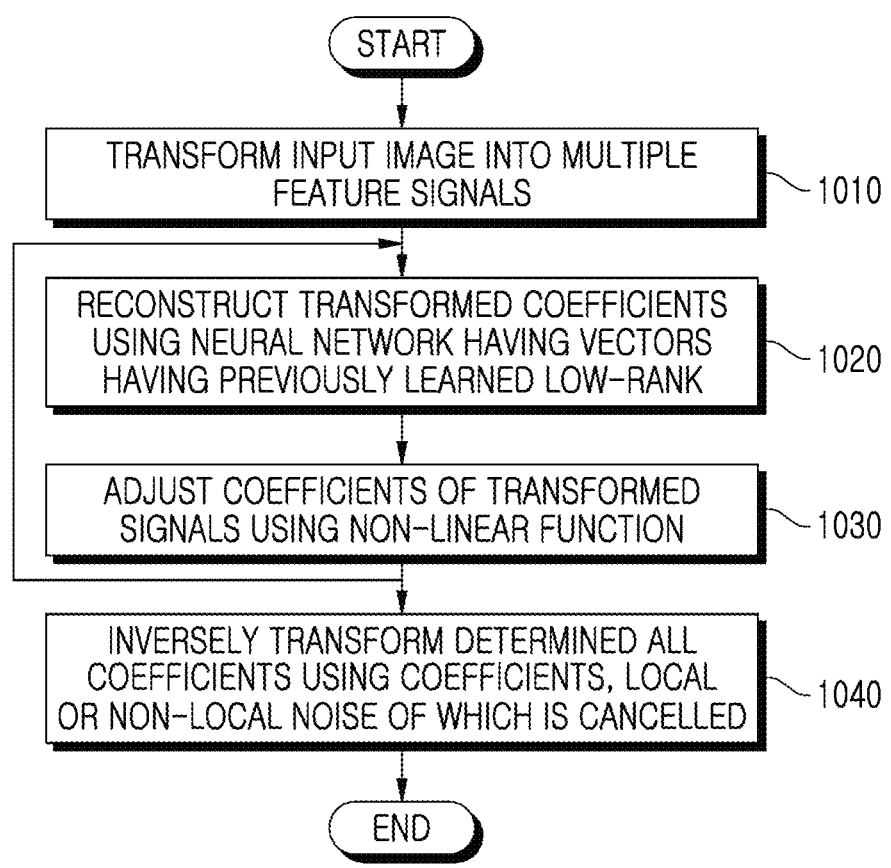
FIG. 10 is a flowchart illustrating a method for reconstructing an image according to an embodiment.

FIG. 10 is a flowchart illustrating a method for reconstructing an image according to an embodiment.

Referring to FIG. 10, an image reconstruction method performed by a processor of an image reconstruction device according to an embodiment is shown.

In operation 1010, the image reconstruction device may transform an input image into signals corresponding to different frequencies. For example, an image processing device may decompose and transform the input image into signals corresponding to different domains using a non-local basis transform. Specifically, the image processing device may transform the input image into multiple feature signals by applying the non-local basis transform to the input image.

In this case, the image reconstruction device may transform the input image or a component passing through an upper neural network into signals corresponding to different domains by applying the non-local basis transform to the input image or the component passing through the upper neural network. Herein, the non-local basis transform may be used to transform the component passing through the upper neural network into signals corresponding to different domains such that multiple frequency components are repeatedly decomposed for the component passing through the upper neural network.

Specifically, the image reconstruction device may transform a coefficient component of a feature signal into multiple feature signals without loss of signal by applying the non-local basis transform to the coefficient component of the feature signal in a hidden layer in a neural network.

The non-local basis transform may be used to transform the coefficient component of the feature signal into multiple feature signals without loss of signal by applying the neural network to decomposed signals. The coefficient component of each of the input image and the feature signal may be transformed into multiple feature signals without loss of signal to decompose a directional component of each of local noise, included in the coefficient component of each of the input image and the feature signal in the hidden layer in the neural network, and non-local noise based on the non-local basis transform.

The image reconstruction device according to an embodiment may transform the input image into signals by applying a wavelet transform to the input image. The image processing device may transform the input image into signals to decompose a noise component included in the input image based on the wavelet transform.

The image reconstruction device according to an embodiment may repeatedly apply the wavelet transform to a low pass component of the upper neural network. The image processing device may transform the input image into signals of a plurality of levels, each of which has the same intensity range.

In operation 1020, the image reconstruction device may reconstruct coefficients including a noise component using a neural network having basis vectors which have a previously learned low-rank. The image processing device may cancel noise included in coefficients decomposed into multiple feature components, using a convolutional neural network. The neural network may include a channel concatenation layer or a channel sum layer, which combines outputs of a plurality of layers included in the neural network.

In operation 1030, the image reconstruction device may adjust coefficients of the transformed signals using a nonlinear function. Herein, the nonlinear function may be an ReLU, sigmoid, or tan h operation. Furthermore, the nonlinear function may include a nonlinear function in the form of meeting a reconstruction condition such as CReLU. In this case, reconstructing the coefficients in operation 1020 and adjusting the transformed coefficients in operation 1030 may be repeatedly performed according to a form of the configured neural network.

In operation 1040, the image reconstruction device may inversely transform all coefficients determined using the transformed coefficients into an output image. The inverse transform according to an embodiment may be the inverse of the transform performed in operation 1010. All the coefficients may be coefficients for the entire domain of the transformed signals.

The input image may be a medical image including noise, and the output image may be a denoised medical image. Alternatively, the input image may be a low-resolution medical image, and the output image may be a high-resolution medical image.

Since details described with reference to FIGS. 1 to 9 are applied to respective operations shown in FIG. 10 without change, a detailed description will be omitted.

As such, the method according to an embodiment may increase image reconstruction performance, may reduce an amount of calculation necessary for reconstruction, and may enhance a reconstruction speed by reconstructing the image using the neural network based on the convolutional framelet. Herein, the neural network in the inventive concept may include a multi-resolution neural network, a neural network which meets a frame condition (or a frame constraint), a neural network which meets a low-rank Hankel matrix constraint, or a multi-resolution neural network including a pooling layer and an unpooling layer.

In addition, the method according to an embodiment may receive an input image to be reconstructed and may learn the received input image through the above-mentioned process or may reconstruct a high-resolution image from the input image using a configured neural network, for example, at least one of a neural network which meets a low-rank Hankel matrix constraint, a neural network which meets a frame constraint, or a neural network learned by a learning model generated through a mathematical analysis based on a convolutional framelet. Herein, the process of reconstructing the image using the neural network may include all contents of FIGS. 1 to 10.

Meanwhile, the method according to an embodiment of the inventive concept may be written with a program executable in a computer to be implemented in various storage media such as magnetic storage media, optical readout media, and digital storage media.

Implementations of various techniques described in the specification may be implemented in digital electronic circuitry, or in computer hardware, firmware, or software, or in combinations thereof. Implementations may be implemented as a computer program product, that is, a computer program tangibly embodied in an information carrier, for example, a machine-readable storage device (a computer readable medium) or a radio signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer may include at least one processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. Information carriers suitable for embodying computer program instructions and data may include, for example, semiconductor memory devices, for example, magnetic media such as hard disks, floppy disks, and magnetic tape; optical media such as compact disc-read only memory (CD-ROM) disks and digital video disks (DVDs); magneto-optical media such as floptical disks; and read-only memory (ROM), random access memory (RAM), flash memory, erasable programmable ROM (EPROM), electrically erasable programmable ROM (EEPROM), and the like. The processor and the memory may be supplemented by, or included in, special purpose logic circuitry.

Furthermore, a computer-readable medium may be any available medium accessible by a computer and may include both of a computer storage medium and a transmission medium.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

According to an embodiment of the inventive concept, the apparatus may increase reconstruction performance, may reduce an amount of calculation necessary for reconstruction, and may enhance a reconstruction speed by reconstructing an image using a neural network when there is local noise or non-local noise in the image or when some information of the image is lost.

According to an embodiment of the inventive concept, the apparatus may solve a phenomenon where an image is crushed according to the signal loss of a neural network and a distortion phenomenon, which are problems of the previous neural network, by using a neural network based a convolutional framelet.

According to an embodiment of the inventive concept, the apparatus may increase reconstruction performance, may reduce an amount of calculation necessary for reconstruction, and may enhance a reconstruction speed by configuring a neural network using a local basis and a non-local basis based on a convolutional framelet and reconstructing an image using the neural network based on the convolutional framelet.

According to an embodiment of the inventive concept, the apparatus may simultaneously and efficiently cancel local and non-local noise components of an input signal by using a neural network in which a multi-resolution decomposition process as a signal transform operation.

According to an embodiment of the inventive concept, the apparatus may be applicable to universal signal reconstruction by using transform and inverse transform applicable to any order of a signal and a neural network.

According to an embodiment of the inventive concept, the apparatus may increase reconstruction performance, may reduce an amount of calculation necessary for reconstruction, and may enhance a reconstruction speed by decomposing an input signal into a multi-resolution signal without loss of signal by using a signal transform operation in the process where a neural network decomposes the input signal into the multi-resolution signal and reconstructing the branched multi-resolution signal using the neural network.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method for reconstructing an image, the method comprising:
    receiving an input image; and
    reconstructing an output image from the input image using a neural network meeting a predetermined frame constraint, the reconstructing the output image comprising:
        transforming the input image into signals corresponding to different frequencies;
        adjusting coefficients of the transformed signals using a nonlinear function;
        reconstructing the adjusted coefficients; and
        inversely transforming all coefficients determined using the reconstructed coefficients into the output image.

2. The method of claim 1, wherein the neural network comprises a neural network based on a convolutional framelet.

3. The method of claim 1, wherein the neural network comprises a neural network meeting a low-rank Hankel matrix constraint.

4. The method of claim 1, wherein the transforming comprises:
    transforming the input image into the signals corresponding to the different frequencies by applying at least one of a wavelet transform, a cosine transform, and a Fourier transform to the input image.

5. The method of claim 1, wherein the transforming comprises:
    transforming a coefficient component of each of the input image and a feature signal into multiple feature signals without loss of signal to decompose a directional component of each of local noise, included in the coefficient component of each of the input image and the feature signal in a hidden layer in the neural network, and non-local noise based on a non-local basis transform.

6. The method of claim 1, wherein the adjusting and the reconstructing are repeatedly performed according to a form of the neural network.

7. The method of claim 1, wherein the reconstructing comprises:
    cancelling local noise and non-local noise of the input image using the neural network.

8. A method for reconstructing an image, the method comprising:
    transforming an input image into signals corresponding to different frequencies;
    adjusting coefficients of the transformed signals using a nonlinear function;
    reconstructing the adjusted coefficients using a previously learned neural network; and
    inversely transforming all coefficients determined using the reconstructed coefficients into an output image.

9. The method of claim 8 wherein the transforming comprises:
    transforming the input image into multiple feature signals by applying a non-local basis transform to the input image.

10. The method of claim 8, wherein the transforming comprises:
    transforming the input image into the signals corresponding to the different frequencies by applying at least one of a wavelet transform, a cosine transform, and a Fourier transform to the input image.

11. The method of claim 8, wherein the transforming comprises:
    transforming a coefficient component of each of the input image and a feature signal into multiple feature signals without loss of signal to decompose a directional component of each of local noise, included in the coefficient component of each of the input image and the feature signal in a hidden layer in the neural network, and non-local noise based on a non-local basis transform.

12. The method of claim 8, wherein the adjusting and the reconstructing are repeatedly performed according to a form of the neural network.

13. The method of claim 8, wherein the neural network comprises a neural network meeting a predetermined frame constraint.

14. The method of claim 8, wherein the neural network comprises a neural network based on a convolutional framelet.

15. The method of claim 8, wherein the neural network comprises a neural network meeting a low-rank Hankel matrix constraint.

16. The method of claim 8, wherein the reconstructing comprises:
    cancelling local noise and non-local noise of the input image using the neural network.

17. The method of claim 8, wherein the adjusting comprises:
    adjusting the coefficients of the transformed signals using a local basis transform and the nonlinear function.

18. The method of claim 8, wherein the reconstructing comprises:

transforming a low-resolution image into a high-resolution image using a convolutional neural network (CNN) included in the neural network.

19. An apparatus for reconstructing an image, the apparatus comprising:
- non-transitory memory storing computer-readable instructions; and
- at least one processor,
- wherein the at least one processor is configured to execute the computer-readable instructions to:
- receive an input image; and
- reconstruct an output image from the input image using a neural network meeting a predetermined frame constraint, the at least one processor reconstructing the output image by being configured to execute the computer-readable instructions to:
  - transform the input image into signals corresponding to different frequencies;
  - adjust coefficients of the transformed signals using a nonlinear function;
  - reconstruct the adjusted coefficients; and
  - inversely transform all coefficients determined using the reconstructed coefficients into the output image.

* * * * *